Patented Nov. 7, 1922.

1,434,908

UNITED STATES PATENT OFFICE.

HAROLD A. MORTON AND MARION M. HARRISON, OF AKRON, OHIO, ASSIGNORS TO THE MILLER RUBBER COMPANY, OF AKRON, OHIO, A CORPORATION OF OHIO.

PROCESS OF VULCANIZING RUBBER.

No Drawing.   Application filed March 5, 1921.   Serial No. 449,897.

*To all whom it may concern:*

Be it known that we, HAROLD A. MORTON and MARION M. HARRISON, citizens of the United States, and residents of Akron, in the county of Summit and State of Ohio, have invented certain new and useful Improvements in Processes of Vulcanizing Rubber, of which the following is a specification.

Our present invention relates to improvements in methods of manufacturing vulcanized rubber articles. Heretofore many articles of rubber, such for example, as sheet rubber dental dams, bathing caps, clothing protectors, bed sheets, and the like, have been vulcanized exclusively by the vapor cure, as for instance by the use of sulphur chloride. In the manufacture of rubber articles by this method the rubber is mixed with the proper ingredients to impart the desired color and other physical qualities desired, calendered to the proper thickness, and dusted with a powdered material such as starch, as it leaves the calender, to prevent sticking. It is thereafter made up into the desired articles, placed in a closed chamber, and subjected to the warm fumes of the sulphur chloride to effect the vulcanization.

It has long been realized that such processes have disadvantages, one of which is the difficulty of securing an even or uniform vulcanization, due to the rapidity with which the sulphur chloride acts, some parts being over-cured and others under-cured, and especially is this true of articles of a complex formation, where the fumes are slow to reach or penetrate folded or pleated portions, or portions in connection with seams. Another objection is the disagreeable odor emanating from goods manufactured by the sulphur-chloride method of vulcanization. Still another objection is that while, by the sulphur chloride method, coloring materials can be used which will not survive any other known method of vulcanization, yet the vapors tend to dull or fade the colors, thereby detracting from the appearance of the finished goods.

Despite such objections the practice of this method has been continued for lack of any other.

In the vulcanization of articles by heat where sulphur incorporated in the rubber compound is used, it has been discovered that if certain organic compounds known as "accelerators" are incorporated in the rubber compound with the sulphur during the mixing, they will shorten the period necessary for vulcanization, or enable it to be performed at a lower temperature.

We have discovered that the sulphur and accelerator may be separately applied, one by being incorporated in the rubber compound during the mixing, and the other by application to the exterior of the rubber sheet or article, and that when so applied and the sheet or article submitted to a moderate degree of heat, the ingredient upon the exterior surface will migrate or penetrate the interior and mingle with the ingredient therein, and effect vulcanization under the action of such heat by the coaction of the two ingredients within the body of the rubber. By incorporating sulphur, for example, in the goods as heretofore manufactured for curing by the sulphur chloride method, and applying an accelerator to the exterior surface, vulcanization may be effected by a moderate amount of heat, thereby dispensing with the necessity for a vapor cure and its attendant disadvantages.

We have found that by such method of procedure almost any coloring material adapted for rubber work may be used, and that the colors are not detrimentally affected.

In its broadest aspects, therefore, our invention comprises the mixing together of the rubber stock having incorporated therein one or two ingredients designed to coact in the presence of heat to effect vulcanization, and applying the other ingredient to the surface of the article, and thereafter applying heat to cause the ingredient upon the surface to penetrate the body of the rubber and coact with the other ingredient therein.

One manner of carrying out our invention is to incorporate one of the ingredients with the rubber in the mixing, to then roll the rubber into sheets upon a suitable calender, and apply the other ingredient in the shape of the accelerator to the exterior surface or surfaces of the sheet. Rubber sheets intended for the manufacture of bathing caps and other articles such as hereinbefore referred to have usually applied to the faces thereof at the calender coatings of powdered material such as starch to prevent the sticking of the sheets during the subsequent handling. We have dicovered that this powdered material may be used as a carrier for the ingredient which is to be applied to the exterior surface of the sheet and at the same time will serve to dilute the ingredient. A convenient method of procedure is to incorporate sulphur with the rubber of the mill, and after the rubber compound has been shaped or sheeted, to dust or sprinkle onto the surface or surfaces of the article or sheet the starch having the accelerator evenly distributed throughout the same. It is obvious, however, that if desired the accelerator may be incorporated with the rubber compound and the sulphur supplied in connection with the starch.

Our invention is also applicable to the manufacture of goods by what is known as the dipped process wherein articles are formed by dipping cores into a solution of rubber in a volatile solvent, the rubber being deposited on the core. Many articles such as finger cots, gloves and the like, have been made in this manner and vulcanized by the vapor cure. By incorporating one of the ingredients in the solution, and dusting the other upon the coating formed on the core the article may be vulcanized under moderate heat as above described. In its relation to dipped goods, the present process has the further advantage of eliminating the danger of fire which is present in connection with the so-called "acid curing process" customarily employed.

Some accelerators are soluble in the hydrocarbons such as are commonly used as rubber solvents, and such hydrocarbons may therefore be used as a carrier and dilutent for the accelerator, which may conveniently and advantageously be the method employed in the manufacture of dipped goods. In the case of an accelerator, soluble in water, it is possible to cure the product by immersing the sulphur carrying stock in a hot aqueous solution of the accelerator for a suitable length of time.

We have also found that when desired articles may be cold pressed into shape, by suitable dies, from sulphur containing stock and may afterwards be packed in starch containing an accelerator and the starch and the articles raised to such a temperature that vulcanization will take place in a reasonable time.

Any suitable accelerator may be used, and as examples of those which we have found suitable for the purposes above described mention may be made of piperidine and compounds composed of piperidine with carbon bisulphide, and also certain of the aliphatic amines, particularly dimethyl amine compounded with carbon bisulphide.

The following is given as a specific example:

Take smoked sheet rubber 97 parts, zinc oxide 2 parts, sulphur 1 part.

Mill the ingredients together in the ordinary manner, and calender the stock .007" thick. As the stock comes from the calender dust it with the following finely ground mixture:

Starch 95 parts, dimethyl amine carbon disulphide product 5 parts.

The roll of dusted compound, if suspended in a hot air oven at a temperature of 150 degrees Fahrenheit, will be completely vulcanized in forty-eight hours. After curing, the excess dust may be removed by blowing with compressed air.

Having thus described our invention, what we claim is:

1. The hereinbefore described method of effecting the vulcanization of rubber compounds which consists in incorporating with the rubber compound one of two ingredients which will coact to effect vulcanization, applying the other ingredient to the surface of the rubber compound, and thereafter causing the surface ingredient to penetrate the rubber and coact with the first named ingredient to effect vulcanization.

2. The hereinbefore described method of effecting the vulcanization of rubber compounds which consists in incorporating with the rubber compound one of two ingredients which will coact to effect vulcanization, applying the other ingredient to the surface of the rubber compound, and thereafter heating the rubber compound to cause the surface ingredient to flow and penetrate the rubber compounds.

3. The hereinbefore described method of effecting the vulcanization of rubber compounds which consists in incorporating with the rubber compound one of two ingredients which will coact to effect vulcanization, mixing the other ingredient with a suitable carrier and applying it to the surface of the rubber compound, and thereafter heating the compound.

4. The herein described method of effecting the vulcanization of rubber compounds which consists in incorporating with the compound a suitable proportion of sulphur, applying to the exterior thereof an organic accelerator, and causing the accelerator to penetrate the compound.

5. The herein described method of effecting the vulcanization of rubber compounds which consists in incorporating with the compound a suitable proportion of sulphur, applying to the exterior thereof an organic accelerator, and heating the compound to cause the accelerator to penetrate the compound.

6. The herein described method of effecting the vulcanization of rubber compounds which consists in incorporating in the compound a suitable quantity of sulphur, applying to the exterior of the article a powdered material containing an organic accelerator, and heating the compound.

In testimony whereof, we affix our signatures.

HAROLD A. MORTON.
MARION M. HARRISON.